Aug. 4, 1959  F. J. C. WEBER  2,898,264
BACTERICIDAL COMPOSITIONS TO BE USED SPECIALLY
FOR FOOD-INDUSTRIES EQUIPMENT
Filed Aug. 28, 1956  2 Sheets-Sheet 1
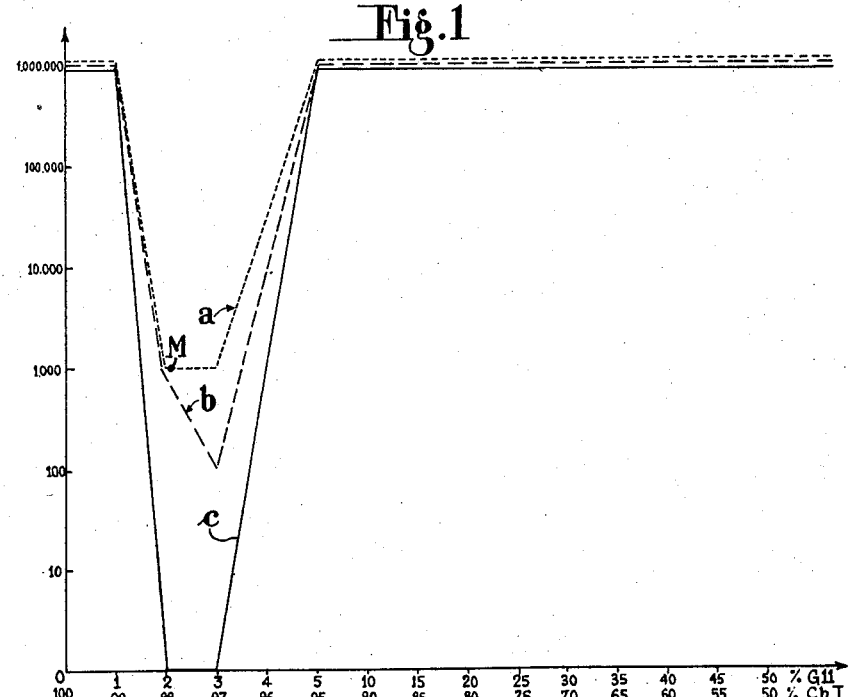
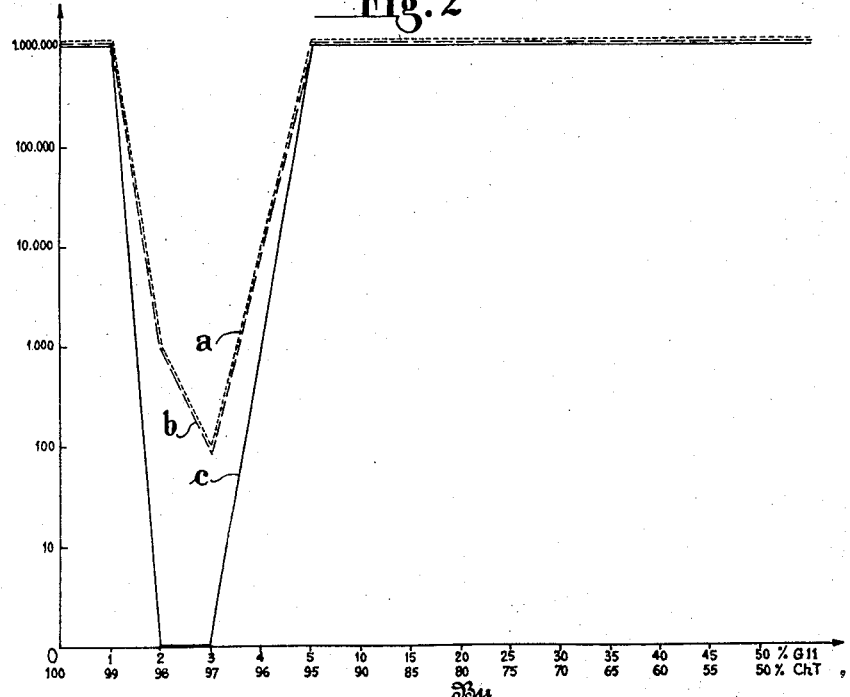

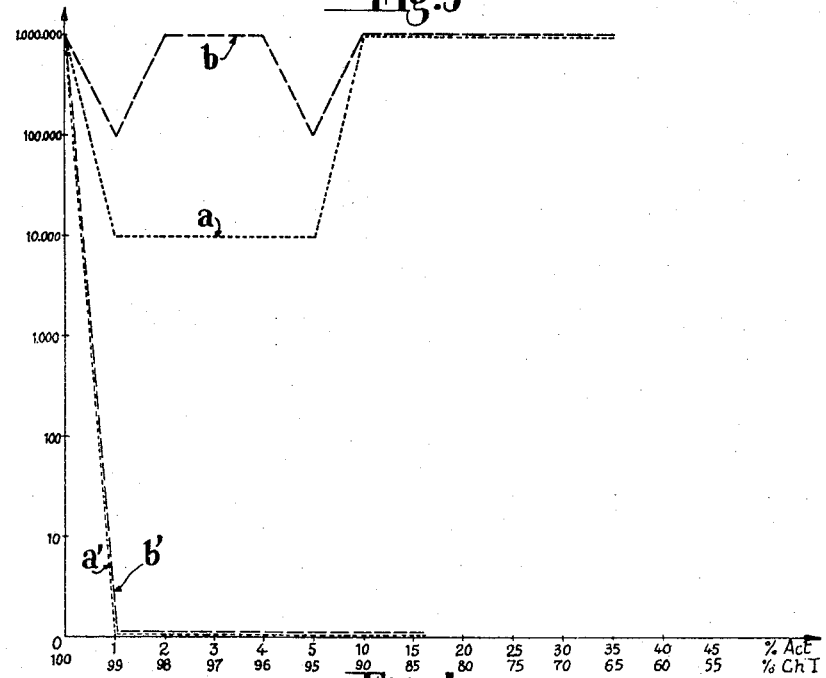
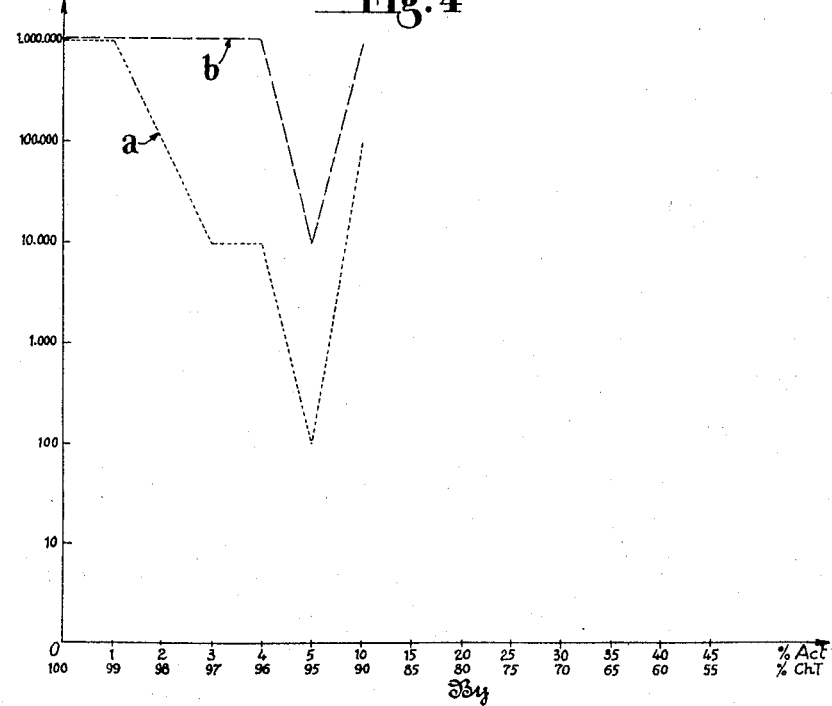

United States Patent Office 2,898,264
Patented Aug. 4, 1959

2,898,264

BACTERICIDAL COMPOSITIONS TO BE USED SPECIALLY FOR FOOD-INDUSTRIES EQUIPMENT

Francis Jacques Charles Weber, Nancy, France, assignor to Colgate-Palmolive Company, New York, N.Y., a corporation of Delaware Application August 28, 1956, Serial No. 606,646

Claims priority, application France September 15, 1955

4 Claims. (Cl. 167—30)

This invention relates to bactericidal compositions to be used mainly for cleaning of the equipment which comes in contact with foodstuffs during production, manufacture, and distribution, and particularly of the equipment used in the dairy industry.

An object of the present invention is to provide bactericidal compositions which are to be used especially in dairy industries for the cleaning, washing and disinfection both on the farm and in the factory, of the various pieces of equipment such as milking pails, churns, filters, milking machines, creamers, tanks, cans, pipes, filling machines, glassware, cream separators, vats, kettles, delivery material, floors of the making centers, etc., which compositions have exceptional germicidal properties, when used in suitable proportions, and which in case of incomplete rinsing, that is if traces remain, have no action on the lactic flora.

The invention will be described and illustrated in conjunction with the drawing in which:

Figs. 1 and 2 show the synergistic bacterial activity of one composition of the invention at 0.1 gram per liter and 1 gram per liter concentration, respectively, and Figs. 3 and 4 show the synergistic bacterial activity of a different composition of the invention at concentrations of 0.1 and 1 gram per liter (curves $a$, $b$ and $a'$, $b'$ respectively) in Fig. 3 and of 0.001 gram per liter in Fig. 4.

The bactericidal compounds according to the invention are characterized by the fact that they include a mixture of certain proportions of (I) N-sodium N-chloroparatoluene sulfonamide, and (II) one or several derivatives corresponding to the general formula: P—A—P, in which P is a phenyl radical bearing a function OH in position 2 and one up to several atoms of chlorine, and A is $CH_2$ or S.

Specific examples of compounds within the formula P—A—P, which have given particularly good results are the following products:

2,2' - dihydroxy - 3,3',5,5',6,6'-hexachlorodiphenylmethane,
2,2'-dihydroxy-5,5'-dichlorodiphenylmethane, and
2,2'-thiobis (4,6 dichlorophenol).

The N-sodium N-chloroparatoluene sulfonamide and the three above mentioned compounds are known respectively under the trade denomination of "Chloramine T," "G–11," "G–4," and "Actamer" and some of them have already been used separately as bactericides in various industries.

While the products used up-to-now generally contained only one of these bactericidal or germicidal substances, the compositions proposed in this invention are characterized by the fact they are mixtures in particular proportions.

It has been discovered, according to the invention, that mixtures of the above mentioned products due to a synergetic effect are much more efficient as a germicide than each of them used alone and in the same proportion.

Besides, it has been discovered that the use of these germicidal mixtures for the cleaning and disinfection of equiment used in the food industry and, particularly in the dairy industries and related industries show a specially great advantage as these mixtures in suitable proportions destroy nearly all the harmful microorganisms without provoking any dangerous selections. Moreover, these mixtures do not cause any inconvenience to the lactic flora when, after an incomplete rinsing of the equipment, traces of them get into the milk.

These germicidal mixtures can be used alone or preferably in combination with detergents so that a unique composition be obtained assuring at the same time washing of the material and destruction of the harmful bacterial flora.

Any detergent, particularly the anionic or non ionic ones, can be used in combination with the germicidal mixture, the preference being given to those having particularly wetting properties such as alkylaryl sulfonates, alkyl sulfonates, alkyl sulfates which may be either of the sulfated fatty alcohol type or of the sulfated olefin type such as "Teepol," and succinic acid derivatives.

The usual mineral builders and fillers of detergent products, such as sodium metasilicate, orthophosphates, pyrophosphates, sodium polyphosphates, sodium carbonate, sodium sulfate, and the like may also be incorporated in the compositions.

The alkylaryl sulfonates which may be used include the alkyl derivatives of benzene sulfonate in which the aliphatic chain preferably contains 10 to 16 carbon atoms and may be produced for example from chlorinated paraffins or from polymers of unsaturated hydrocarbons such as propylene or butylene. Preferably salts of dodecyl benzene sulfonic acid are used such as the sodium, potassium, ammonium and triethanolamine salts. The alkyl derivatives of naphthalene sulfonate are equally susceptible of being used in the composition, in which case the aliphatic chain preferably has 12 to 14 carbon atoms. If alkyl sulfates are used the sodium, potassium, ammonium and triethanolamine salts of derivatives are chosen whose alkyl chain contains 10 to 18 carbon atoms, and more particularly those having 12 to 16 carbon atoms.

The relative proportions of the bactericidal mixture on one hand and of the detergent builders and fillers on the other hand can vary depending on the greater need of either the bactericidal or the detergent effect.

We can state, however, that generally speaking the concentration of the germicidal mixtures in the washing solution is to be at least 0.1 gram per liter to be actually efficient and that there is no further practical advantage to go over the 1 gram per liter concentration.

Moreover, the relative proportions of the constituents of the germicidal mixtures have their importance as they control the synergetic effect which is particularly great in a fairly narrow range of relative concentrations. For instance the synergetic effect is quite marked for mixtures containing 1 to 5% of 2,2'-dihydroxy-3,3',5,5',6,6'-hexachlorodiphenylmethane and 99 to 95% of N-sodium N-chloroparatoluene sulfonamide, as well as for those containing 1 to 5% of 2,2'-dihydroxy-5,5'-dichloro-diphenylmethane or of 2,2'-thiobis (4,6-dichlorophenol) and 99 to 95% of N-sodium N-chloro-paratoluene sulfonamide. Compounds in which these relative proportions are observed whether or not they do contain detergents and fillers are, thereby, the preferred compounds according to the invention.

Tests described below and Figs. 1 and 2 of the drawing which summarise the results of them show clearly the synergetic effect obtained when mixing the two types of above mentioned compounds and clearly point out the relative proportions to be taken into consideration to get the best results.

Such tests have been performed as follows:

Normally mixed raw milk such as it comes to the factory in milk-churns is used.

A set of 7 sterile tubes is kept ready for each bactericidal product or bactericidal mixture to be studied. Each tube is filled with 10 cc. of milk.

Besides, for each bactericidal product or bactericidal mixture to be studied 5 tubes containing 10 cc. of distilled sterile water are prepared.

1 g. of the bactericidal product or of the mixture to be analysed is placed in the first tube containing sterile water. After shaking and complete dissolution 1 cc. of this first solution (1/10 solution or solution No. 1) is taken out with a sterile pipette and brought into the second tube. The tube is then shaken to get a perfectly homogeneous medium. A 1/100 solution is then obtained (or solution No. 2). Work is pursued in that way until the 1/100,000 solution (or solution No. 5) is obtained.

Then 1 cc. of solution No. 1 is taken out with a sterile pipette and introduced in a first tube containing milk (A1).

To a second tube of milk (A2) 1 cc. of solution No. 2 is added.

To a third tube of milk (A3) 1 cc. of solution No. 3 is added.

To a fourth tube of milk (A4) 1 cc. of solution No. 4 is added.

To a fifth tube of milk (A5) 1 cc. of solution No. 5 is added.

The tubes A1, A2, A3, A4, A5 therefore contain respectively 10 g., 1 g., 0.1 g., 0.01 g., and 0.001 g. of the bactericidal product per liter of milk.

To this set of 5 tubes are added the last two being used as check samples (AT1–AT2).

This series of tubes AT1, AT2, A1, A2, A3, A4, A5 is placed for 12 hours at 30° C. After 12 hours' incubation, analyses are made on each tube.

Such analyses include:

1. Dilution of the milk with physiological water
2. Research and numeration:

(a) of the bacteria producing hydrogen sulfide (putrefying bacteria) on simple peptonized water, in presence of a basic-lead acetate paper. Incubation for 46 hours at 37° C.;

(b) of the total indol producing bacteria on simple peptonized water. Incubation for 48 h. at 37° C. Presence of indol detected by means of the Ehrlich-Kovacs reagent;

(c) of the coliform bacteria (Escherichia-Aerobacter groups —(EA)—) on an ox-bile and brilliant green medium. Incubation for 48 h. at 37° C.;

By repeating these tests with different relative proportions of the two constituents of the bactericidal mixture, it is possible to draw curves indicating, for a given percentage of bactericidal mixture in the milk, the number of bacteria of the different types mentioned above present in 1 cc. of milk incubated for 12 h. at 30° C.

Figs. 1 and 2 show such curves in relation respectively with bactericidal mixture concentrations of 0.1 g./l. and 1 g./l. for mixture of N-sodium N-chlorosulfonamide and of 2,2'-dihydroxy-3,3',5,5',6,6'-hexachlorodiphenyl - methane. On the ordinate of these diagrams are represented the number of bacteria of types a, b, c, above and on the abscissa on the upper line the percentage of 2,2'-dihydroxy-3,3',5,5',6,6' hexachlorodiphenylmethane (G–11) and on the lower line the complementary percentage of N-sodium N-chloroparatoluene sulfonamide (ChT) in the bactericidal mixture.

On these two figures the relative proportions showing the greatest interest only have been shown, the abscissae being, besides, on a scale five times greater than for the other proportions, for the relative proportions showing the synergetic effect.

As can be seen on these figures, one obtains both for the concentration of 0.1 g. of bactericidal mixture per litre and of 1 g./litre, a synergetic effect very important for each kind of bacteria when the proportions of 2,2'-dihydroxy-3,3',5,5',6,6' - hexachlorodiphenylmethane and of N-sodium N-chloroparatoluene sulfonamide in the mixture are respectively 1 to 5% and 99 to 95% with a maximum at 3% of the first and 97% of the second. Similar results are obtained with concentrations between 0.1 and 1 g./l. of bactericidal mixture.

The same observations have been made with a series of tests which have been run according to another method (Figures 3 and 4). According to that method, the bactericidal mixture is added to some raw milk (1/50 dilution) in the proportions of 10, 1, 0.1, 0.01, 0.001 g./l. After 30 minutes of contact at 20° C. one proceeds with the numeration of the bacteria producing hydrogen sulfide (a) and of the total indol producing bacteria (b) using the analyses methods described above.

When repeating these experiments with different relative proportions of the two constituents of the bactericidal mixture, it is possible to draw some curves indicating for a given percentage of bactericidal mixture the variation of the number of bacteria with the composition of the bactericide.

Figures 3 and 4 being drawn on the same principle as Figures 1 and 2 show curves in relation with bactericidal mixture concentrations of respectively 0.001 g./l. (Figure 4), 0.1 g./l. (Figure 3, curves a, b) and 1 g./l. (Figure 3, curves a', b'). On the ordinate of these figures are represented the number of germs of types a and b above and on the abscissa on the upper line the percentage of 2,2'-thiobis (4,6-dichlorophenol) (Act) and on the lower line the complementary percentage of N-sodium N-chloroparatoluene sulfonamide (CHT) in the bactericidal mixture. Figures 3 and 4 lead to the same results and show perfectly the interesting bactericidal activity of mixtures containing 1 to 5% of 2,2'-thiobis (4,6-dichlorophenol) and 99 to 95% of N-sodium N-chloroparatoluene sulfonamide.

Nearly the same results are obtained when replacing the 2,2'-thiobis (4,6-dichlorophenol) by the 2,2'-dihydroxy-5,5'-dichlorodiphenylmethane.

The sanitary advantages of this invention are obvious according to what is said above; economical advantages are of equal importance as 2,2'-dihydroxy-3,3',5,5',6,6'-hexachlorodiphenylmethane, 2,2'-dihydroxy-5,5'-dichlorodiphenylmethane, 2,2'-thiobis (4,6-dichlorophenol) which represent the minor part of the bactericidal mixture are far more expensive on an equal weight basis than N-sodium N-chloroparatoluene sulfonamide which is the major part of the mixture.

The use of the bactericidal compositions proposed by the invention is particularly simple. The germicidal solution may be prepared by simple dissolution in cold water of the product in the desired proportions, e.g., 1 grain per litre. The equipment or part thereof to be treated may be either immersed in the solution (in the case of small objects) or washed by rubbing (walls, floors, etc.) or by circulation of the solution (tanks, pipes, etc.), or by any other washing method, and then rinsed.

Bactericidal compositions indicated below are given as examples. Each of these compounds can be used at the rate of about 1 g./l. of washing solution.

*Example No. 1*

| | Percent |
|---|---|
| 2,2' - dihydroxy - 3,3',5,5',6,6' - hexachlorodiphenylmethane | 1.5 |
| N-sodium N-chloroparatoluene sulfonamide | 48.5 |
| Sodium metasilicate | 13 |
| Sodium carbonate | 20 |
| Tripolyphosphate of sodium | 10 |

| | |
|---|---|
| Sodium dodecylbenzene sulfonate at 30% active ingredient (balance being sodium sulfate) | 4 |
| Water | 3 |
| | 100.0 |

*Example No. 2*

| | |
|---|---|
| 2,2'-thiobis (4.6-dichlorophenol) | 2.5 |
| N-sodium N-chloroparatoluene sulfonamide | 47.5 |
| Sodium metasilicate | 15 |
| Sodium carbonate | 20 |
| Tripolyphosphate of sodium | 7.5 |
| Sodium dodecylbenzene sulfonate at 30% active ingredient (balance being sodium sulfate) | 7.5 |
| | 100.0 |

*Example No. 3*

| | |
|---|---|
| 2,2' - dihydroxy - 3,3',5,5',6,6' - hexachlorodiphenylmethane | 0.03 |
| N-sodium N-chloroparatoluene sulfonamide | 0.97 |
| Sodium metasilicate | 26 |
| Sodium carbonate | 39 |
| Tripolyphosphate of sodium | 20 |
| Sodium dodecylbenzene sulfonate at 30% active ingredient (balance being sodium sulfate) | 8 |
| Water | 6 |
| | 100.0 |

*Example No. 4*

| | |
|---|---|
| 2,2' - dihydroxy - 3,3',5,5',6,6' - hexachlorodiphenylmethane | 0.04 |
| N-sodium N-chloroparatoluene sulfonamide | 0.96 |
| Sodium metasilicate | 49 |
| Sodium carbonate | 10 |
| Trisodium phosphate | 32 |
| Sodium salt of sulfuric acid ester of alcohols from coconut oil at 40% active ingredient (balance being sodium sulfate) | 6 |
| Water | 2 |
| | 100.0 |

*Example No. 5*

| | |
|---|---|
| 2,2'-dihydroxy-5,5'-dichlorodiphenylmethane | 0.02 |
| N-sodium N-chloroparatoluene sulfonamide | 0.98 |
| Sodium metasilicate | 40 |
| Sodium carbonate | 35 |
| Tripolyphosphate of sodium | 10 |
| Sodium alkyl sulfonate (Mersolat) | 5 |
| Water | 9 |
| | 100.0 |

Of course, the invention is not limited to the above described examples.

Having thus described the invention and the manner of using the compositions, what is claimed is:

1. A bactericidal cleaning composition comprising N-sodium N-chloroparatoluene sulfonamide and a chlorinated 2-hydroxy phenyl compound selected from the group consisting of (a) 2,2'-dihydoxy-3,3',5,5',6,6'-hexachlorodiphenylmethane, (b) 2,2' - dihydroxy - 5,5' - dichlorodiphenylmethane, and (c) 2,2'-thiobis (4,6-dichlorophenol), the proportions being from about 95 to 99 parts of said sulfonamide and 1 to 5 parts of said chlorinated 2-hydroxy phenyl compound.

2. A bactericidal cleaning composition in accordance with claim 1 which contains an anionic organic detergent.

3. A method of cleaning equipment in the food processing industry which comprises washing said equipment with an aqueous solution comprising N-sodium N-chloroparatoluene sulfonamide and a chlorinated 2-hydroxy phenyl compound selected from the group consisting of (a) 2,2'-dihydroxy-3,3',5,5',6,6'-hexachlorodiphenylmethane, (b) 2,2' - dihydroxy - 5,5' - dichlorodiphenylmethane, and (c) 2,2'-thiobis (4,6-dichlorophenol), the proportions being from about 95 to 99 parts of said sulfonamide and 1 to 5 parts of said chlorinated 2-hydroxy phenyl compound.

4. A method as set forth in claim 3 wherein said mixture of sulfonamide and chlorinated 2-hydroxy phenyl compound is in a concentration of about 0.001 to 1 gram per liter of said aqueous solution.

References Cited in the file of this patent

UNITED STATES PATENTS 2,480,556    Craige _____ Aug. 30, 1949

OTHER REFERENCES

Chem. Abst., vol. 36, 1942, p. 2246[2].

Wadley: The Evidence Required to Show Synergistic Action of Insecticides and a Short Cut in Analysis, USDA, June 1945, pp. 1–7.